United States Patent
Hashimoto et al.

(10) Patent No.: US 6,363,727 B1
(45) Date of Patent: Apr. 2, 2002

(54) COLD ACCUMULATING MATERIAL AND COLD ACCUMULATION REFRIGERATOR USING THE SAME

(75) Inventors: Keisuke Hashimoto; Masami Okamura; Tomohisa Arai, all of Yokohama (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 09/468,878

(22) Filed: Dec. 22, 1999

(30) Foreign Application Priority Data

Dec. 28, 1998 (JP) .......................................... P10-377370

(51) Int. Cl.⁷ ................................................ F25B 9/00
(52) U.S. Cl. ............................................................ 62/6
(58) Field of Search ........................................ 62/6, 909

(56) References Cited

U.S. PATENT DOCUMENTS

| | | | |
|---|---|---|---|
| 4,835,973 A | | 6/1989 | Jones et al. |
| 5,186,765 A | * | 2/1993 | Arai et al. ................... 148/301 |
| 5,269,854 A | * | 12/1993 | Takahashi et al. ........... 148/301 |
| 5,293,749 A | * | 3/1994 | Nagao et al. ..................... 62/6 |
| 5,593,517 A | * | 1/1997 | Saito et al. ................. 148/301 |
| 6,003,320 A | * | 12/1999 | Okamura et al. ................. 62/6 |

FOREIGN PATENT DOCUMENTS

| | | |
|---|---|---|
| EP | 0 411 591 | 2/1991 |
| EP | 0 454 491 | 10/1991 |
| EP | 0 870 814 | 10/1998 |
| EP | 0 947 785 | 10/1999 |
| WO | WO 93/11401 | 6/1993 |
| WO | WO 98/28585 | 7/1998 |

* cited by examiner

*Primary Examiner*—William Doerrler
*Assistant Examiner*—Malik N. Drake (57) ABSTRACT

A cold accumulating material comprises a set of particulate cold accumulating substances, pores formed between the particulate cold accumulating substances, and a binder for mutually binding the particulate cold accumulating substances, wherein a porosity of the cold accumulating material is 15–70 vol %. A median diameter of the pores existing in the cold accumulating material is preferably set to 10–300 μm. An oxygen concentration at an area ranging from a surface of the particulate cold accumulating substance to a portion having a depth of 100 angstroms (A) from the surface is preferably set to 5–80 at %. According to the above structure, there can be provided a cold accumulating material and a refrigerator using the cold accumulating material which is free from being finely pulverized, and has a high mechanical strength, and capable of exhibiting a significant refrigerating performance at low temperature range for a long period of time in a stable condition, and which can be mass-produced with a high production yield and low cost.

18 Claims, 3 Drawing Sheets

COLD ACCUMULATING MATERIAL AND COLD ACCUMULATION REFRIGERATOR USING THE SAME

BACKGROUND OF THE INVENTION

1. Field of the Invention

The present invention relates to a cold accumulating material and a cold accumulating type refrigerator using the same, and more particularly to a cold accumulating material which is free from the risk of being pulverized into fine particles, and is excellent in durability, and exhibits significant refrigerating performance at a low temperature region, and relates to a cold accumulation refrigerator using the cold accumulating material.

2. Description of the Related Art

Recently, superconductivity technology has been progressed remarkably and with an expanding application field thereof, development of a small, high performance refrigerator has become indispensable. For such a refrigerator, light weight, small size and high heat efficiency are demanded, and a small-sized refrigerator has been practically applied to various industrial fields.

For example in a superconductive MRI apparatus, cryopump and the like, a refrigerator based on such refrigerating cycle as Gifford MacMahon type (GM refrigerator), Starling method has been used. Further, a magnetic floating (levitating) train absolutely needs a high performance refrigerator for generating magnetic force by using a superconductive magnet. Further, in recent years, a superconductive power storage apparatus (SMES) or an in-magnetic field single crystal pull-up apparatus has been provided with a high performance refrigerator as a main component thereof.

In the above described refrigerator, the operating medium such as compressed He gas flows in a single direction in a cold accumulating unit filled with cold accumulating materials so that the heat energy thereof is supplied to the cold accumulating material. Then, the operating medium expanded here flows in an opposite direction and receives heat energy from the cold accumulating material. As the recuperation effect is improved in this process, the heat efficiency in the operating medium cycle is improved so that a further lower temperature can be realized.

As a cold accumulating material for use in the above-described refrigerator, conventionally Cu, Pb and the like have been used. However, these cold accumulating materials have a very small specific heat in extremely low temperatures below 20K. Therefore, the aforementioned recuperation effect is not exerted sufficiently, so that even if the refrigerator is cyclically operated under an extremely low temperature, the cold accumulating material cannot accumulate sufficient heat energy, and it becomes impossible for the operating medium to receive the sufficient heat energy. As a result, there is posed a problem of that the refrigerator in which the cold accumulating unit filled with aforementioned cold accumulating material is assembled cannot realize the extremely low temperatures.

For the reason, recently to improve the recuperation effect of the cold accumulating unit at extremely low temperature and to realize temperatures nearer absolute zero, use of magnetic cold accumulating material made of intermetallic compound formed from a rare earth element and transition metal element such as $Er_3Ni$, $ErNi$, $ErNi_2$, $HoCu_2$ having a local maximum value of volumetric specific heat and indicating a large volumetric specific heat in an extremely low temperature range of 20K or less has been considered. By applying the magnetic cold accumulating material to the GM refrigerator, a refrigerating operation to produce an arrival lowest temperature of 4K is realized.

The magnetic cold accumulating material described above is normally worked and used in a form of spherical-shape having a diameter of about 0.1–0.4 mm for the purpose of effectively performing the heat exchange with He gas as cooling medium in the refrigerator. In particular, in a case where the magnetic cold accumulating material (particulate cold accumulating substance) is intermetallic compound containing rare earth element, the particulate cold accumulating substance is worked so as to have a spherical-shape in accordance with working methods such as centrifugal atomizing method. However, according to the working methods such as centrifugal atomizing method, there is caused a disadvantage of that a production yield of the cold accumulating substance having an aimed particle diameter is low, and manufacturing cost of the substance is increased such that the substance cannot be industrially used.

For the reason, there has been tried a method in which magnetic particles prepared by being mechanically pulverized are used. However, there had been raised a problem of that the mechanically pulverized magnetic particles were liable to be further finely pulverized due to vibrations and shocks to be applied to the magnetic particles during the operation of the refrigerator, so that a flow resistance of the cooling gas is increased thereby to abruptly lower the heat exchange efficiency. Therefore, the mechanically pulverized magnetic particles have not been practically used still now.

On the other hand, for the purpose of preventing the mechanically pulverized magnetic particles from being further finely pulverized, the inventors of this invention had investigated an integrating method in which the magnetic particles are bound to each other by utilizing binders such as resin or the like. The method using the binder described above is recognized to be effective in a point of reinforcing the cold accumulating particles having a low mechanical strength, and in a point of preventing the fine cold accumulating particles from spilling out from a cold accumulating unit of the refrigerator.

However, in the cold accumulating material prepared by mutually binding the cold accumulating particles by using the binder, a diameter of the cold accumulating particle is small to be 0.1–0.4 mm and fine pores formed between the cold accumulating particles is liable to be choked or clogged with the binders such as resin, so that there is posed a problem that a percentage of void (porosity) of the cold accumulating unit filled with the cold accumulating material is remarkably lowered to be about 10%. When the percentage of void of the cold accumulating unit is lowered, it becomes difficult for the operating gas (He gas) of the refrigerator to pass through the cold accumulating unit, and to perform the heat-exchange with the cold accumulating material. As a result, there is also posed a problem that function of the refrigerator is lost and the refrigerating effect is abruptly lowered.

In addition, when the cold accumulating materials composed of ferromagnetic substances such as $ErNi_2$, $ErNi_{0.9}Co_{0.1}$, $ErNi_{0.8}Co_{0.2}$ are applied to refrigerators for superconduction systems, such cold accumulating materials were liable to be affected by leakage magnetic field from the superconducting magnet, so that there may be posed a problem of causing a fear, for example, that magnetic force is applied to component parts of the refrigerator thereby to cause a biased wear and deformations to the component parts.

On the other hand, the cold accumulating materials composed of ErRh is antiferromagnetic substance, so that the cold accumulating material has an advantage of being hardly affected by the leakage magnetic field. However, rhodium (Rh) as a constituent is extremely expensive, so that there may be posed a problem that it is extremely difficult to industrially utilize rhodium as a cold accumulating material for a refrigerator in which rhodium is used at an amount of several hundreds grams order.

SUMMARY OF THE INVENTION

The present invention has been achieved to solve the above described problems and an object of the invention is to provide a cold accumulating material which is free from the fear of being finely pulverized, and has a high mechanical strength, and capable of exhibiting a significant refrigerating performance at an extremely low temperature range for a long period of time in a stable condition, and which can be mass-produced with a high production yield and low cost, and provide a cold accumulation refrigerator using the same.

In addition, another object of the present invention is to provide an MRI apparatus, a superconducting magnet for magnetic floating train, a cryopump and an in-magnetic field single crystal pull-up apparatus capable of exerting an excellent performance for a long period of time by using the aforementioned cold accumulation refrigerator.

To achieve the above objects, the inventors of this invention had paid attention to a porous cold accumulating material having a firm bonding structure in which the particulate cold accumulating substances are mutually bonded through a binder. However, when the particulate cold accumulating substances and the binder are simply mixed, a great part of the particulate cold accumulating substances are bunched up together to form a particles-lump.

A cold accumulating material composed of such particles-lumps is in a state where most of spaces between the particulate cold accumulating substances are filled with the binder. Therefore, when the particle-lumps are used as material and formed so as to have a predetermined shape, and further solidifying the material to form a cold accumulating material, it was confirmed that only the cold accumulating material having a remarkably lowered percentage of void (porosity) of about 10–12% could be obtained.

On the other hand, when the addition amount of the binder is decreased so as not to lower the porosity, it was also confirmed that bonding strength between the particulate cold accumulating substances is lowered, and the cold accumulating material is destroyed during the operation of the refrigerator thereby to abruptly progress the pulverization of the cold accumulating material.

Further, the inventors of this invention have found the following findings. Namely, when a shape of the particulate cold accumulating substance and a method of mixing the particulate cold accumulating substance and the binder are improved, the particulate cold accumulating substances can be uniformly dispersed in spite of a small amount of binder, and the porosity between the particulate cold accumulating substances can be increased. Simultaneously, the bonding strength between the particulate cold accumulating substances can be maintained to be high and He gas as cooling medium gas can easily pass through the cold accumulating material. As a result, there is firstly realized a cold accumulating material having a porosity enabling the cooling medium to perform sufficient heat exchange with the cold accumulating material.

Further, the following finding or knowledge was obtained. Namely, when a median diameter of pores formed in the porous cold accumulating material is specified within a predetermined range, the heat-exchanging efficiency between the cold accumulating material and He gas passing through the pores can be increased.

In addition, the following finding or knowledge was also obtained. Namely, when an oxygen concentration at a surface portion of the particulate cold accumulating substance constituting the cold accumulating material is controlled to be within a predetermined range, it becomes possible to increase the bonding strength between the particulate cold accumulating substances while it become possible to effectively prevent the formation of an oxide layer which obstructs the heat-exchange, so that durability and heat-exchanging characteristics of the cold accumulating material can be greatly improved.

Furthermore, it was also confirmed that a shape of the particulate cold accumulating substance has a great influence onto the bonding strength between the cold accumulating particles. In particular, when a shape factor representing a degree of roundness of the particulate cold accumulating substance is controlled to fall within a predetermined range, the bonding strength between the cold accumulating particles can be further increased. The present invention had been completed on the basis of the aforementioned findings.

That is, the cold accumulating material according to the present invention comprises a set of particulate cold accumulating substances, pores formed between the particulate cold accumulating substances, and a binder for mutually binding the particulate cold accumulating substances, wherein a porosity of the cold accumulating material is 15–70 vol %.

Further, it is preferable that a median diameter of pores existing in the cold accumulating material is 10–300 $\mu$m. In addition, it is preferable that an oxygen concentration at a region ranging from a surface of the particulate cold accumulating substance to a portion having a depth of 100 angstrom (A) from the surface is 5–80 at %.

Further, it is preferable that a proportion of the particulate cold accumulating substances each having a shape factor of 1.0–5.0 is 80% or more with respect to the whole number of the set of particulate cold accumulating substances, the shape factor being expressed by M/A wherein M is an area of a maximum circle among circles encircling respective projected images which are formed by projecting the respective particulate cold accumulating substances on a plane while A is an area of the respective projected images. Further, it is preferable that the binder is resin.

In addition, it is also preferable that at least part of the particulate cold accumulating substance contains rare earth element. To put it concretely, it is also preferable that the particulate cold accumulating substance consists of a simple substance of rare earth element or intermetallic compound expressed by general formula: $RM_2$ wherein R denotes at least one of rare earth element selected from the group consisting of Y, La, Ce, Pr, Nd, Pm, Sm, Eu, Gd, Tb, Dy, Ho, Er, Tm and Yb, while M denotes at least one element selected from the group consisting of Ni, Co, Cu, Ag, Al, Ru, In, Ga, Ge, Si and Rh, and z in atomic ratio satisfies a relation: $0 \leq z \leq 9.0$.

Further, it is also preferable that the particulate cold accumulating substance is antiferromagnetic body. In addition, it is also preferable that a particle diameter of the particulate cold accumulating substance is 0.01–3 mm. Furthermore, it is also preferable that an average particle diameter of powdery binder is ½ or less of an average diameter of the particulate cold accumulating substance.

A cold accumulation refrigerator according to the present invention comprises a plurality of cooling stages each composed of a cold accumulating unit filled with a cold accumulating material through which an operating medium flows from a high temperature-upstream side of the cold accumulating unit of each cooling stage, so that heat is exchanged between the operating medium and the cold accumulating material thereby to obtain a lower temperature at a downstream side of the cold accumulating unit, wherein at least part of the cold accumulating material to be filled in the cold accumulating unit is composed of the porous cold accumulating material prepared so as to have a predetermined porosity. In this regard, this cold accumulating material is preferably filled in a low-temperature-downstream side of the cold accumulating unit.

Further, each of the MRI (magnetic resonance imaging) apparatus, superconducting magnet for magnetic floating train, cryopump and in-magnetic field single crystal pull-up apparatus according to the present invention is characterized by comprising the cold accumulation refrigerator described above.

As is clear from the general formula of $RM_z$ ($0 \leq z \leq 9.0$), it is preferable that the particulate cold accumulating substance constituting the cold accumulating material of this invention is preferably constituted by magnetic substances such as a simple substance of rare earth element or intermetallic compound containing rare earth element. In this regard, other than the magnetic substances, the particulate cold accumulating substance can be also constituted by metallic materials such as Pb, Pb alloy, Cu, Cu alloy, stainless steel or the like.

In the general formula described above, R component is at least one of rare earth element selected from the group consisting of Y, La, Ce, Pr, Nd, Pm, Sm, Eu, Gd, Tb, Ho, Dy, Er, Dy, Tm and Yb, while M component is at least one element selected from the group consisting of Ni, Co, Cu, Ag, Al, Ru, In, Ga, Ge, Si and Rh.

When a mixing ratio z of M component with respect to R component exceeds 9.0, a proportion of rare earth element as magnetic element is remarkably lowered thereby to reduce the specific heat of the cold accumulating substance. A preferable range of z is $0.1 \leq z \leq 6$, and more preferably be $0.2 \leq z \leq 4$. Particularly preferable concrete compositions may include $Er_3Ni$, $Er_3Co$, $ErNi$, $ErNi_{0.9}Co_{0.1}$, $HoCu_2$, $ErIn_3$, $HoSb$, $Ho_2Al$. In the above compositions as like $ErNi_{0.9}Co_{0.1}$ which is prepared by substituting Co for a part of Ni of ErNi, when a part of R component is substituted for at least one element of the other R component, or when a part of M component is substituted for at least one element of the other M component, it becomes possible to shift a temperature position of the volumetric specific heat peak of the magnetic substance, and to control width of the peak so as to realize a specific heat which is effective as the cold accumulating material.

When the magnetic material having a composition described above is pulverized or worked by molten-metal-rapidly-quenching-methods such as atomizing method so as to have a particulate shape, aimed particulate cold accumulating substances can be obtained. The particulate cold accumulating substance may take arbitrary shapes such as irregular-shape, spherical-shape or the like. However, in order to smoothly flow the operating medium such as helium gas flowing in the cold accumulating unit packed with the cold accumulating material, to increase the heat-exchanging efficiency of the cold accumulating material with the operating medium, and to stably maintain the heat-exchanging function, the particulate cold accumulating substance is preferably constituted by the magnetic particles having an uniform degree of roundness.

That is, it is preferable that a proportion of the particulate cold accumulating substances each having a shape factor of 1.0–5.0 is 80% or more with respect to the whole number of the set of particulate cold accumulating substances. The shape factor represents the degree of roundness of the particulate cold accumulating material, and is expressed by M/A wherein M is an area of a maximum circle among circles encircling respective projected images which are formed by projecting the respective particulate cold accumulating substances on a plane while A is an area of the respective projected images.

In this regard, in a case where the cold accumulating substance is spherical, i.e., the projected image of the cold accumulating substance is circle (normal circle), the value of the shape factor is 1. It is more advantageous that the particulate cold accumulating substance has a higher roundness, because a broader contact area between adjacent particles through the binder can be effectively secured. As a result, a strength of a shaped body formed by mutually bonding the particulate cold accumulating substances can be increased.

On the other hand, in a case where the shape factor exceeds 5.0, the particulate cold accumulating substance will have a small roundness, so that the contact area between adjacent particles through the binder will become insufficient whereby the bonding strength is lowered. In addition, when such particles are formed into a particle aggregate (bulk material), such particles has a tendency of forming bridges. In such aggregate of the particles, a breakage is liable to occur at portions of the bridges, so that a reliability as the cold accumulating material is easily lowered.

Further, when the proportion of the particulate cold accumulating substances each having a shape factor of 1.0–5.0 is less than 80% with respect to the whole number of the set of particulate cold accumulating substances, the bonding strength in the aggregate is lowered. Therefore, the proportion of the particle each having above shape factor is set to 80% or more, preferably be 90% or more, and more preferably be 95%. In this regard, the above shape factor M/A can be easily measured by an image analysis or the like.

The particulate cold accumulating substances described above can be worked by methods such as pulverizing method, atomizing method or the like. The pulverizing method is not particularly limited. However, when the magnetic material is pulverized while being applied with a relatively small shock energy for a long time in a final pulverizing step, a roundness can be imparted to the particulate cold accumulating substances. For example, it is effective to perform a method in which a ball mill is operated without packing balls as pulverizing media into a pot of the ball mill, or a method in which an agitating mill is operated under a small operation speed.

Further, in general, according to the molten alloy rapidly quenching methods such as centrifugal spraying method, gas-atomizing method or the like, it is easy to obtain the magnetic particles having a high roundness. However, the atomized molten alloy are liable to collide with an inner wall of an atomizing chamber, so that there is produced scale-shaped cold accumulating substances or guitar-shaped cold accumulating substances by mutually contacting and integrating the magnetic particles, whereby there are a lot of cases where the deformed cold accumulating substances are contained in the whole of the substances. In these cases, the deformed magnetic particles can be easily selected and removed by means of, for example, a shape-selector using a slanted belt conveyer.

The size of the particulate cold accumulating substance (magnetic particle) is a factor having a large influence upon the strength of the particle, the cooling functions and the heat transfer characteristics of the refrigerator. The size is preferably set to a range of 0.01–3 mm. If the particle size is smaller than 0.01 mm, the density at which the cold accumulating material is packed in the cold accumulating unit is so high that the resistance to the passage of He gas provided as a refrigerant (operating medium) is abruptly increased and that the cold accumulating material enters the compressor with the flowing He gas and produces wear on the parts thereof to reduce the life of the same.

If the particle size is greater than 3 mm, there is a possibility of occurrence of segregation in the crystalline structure of the particles which renders the particles brittle and, hence, a considerable reduction in the effect of heat transfer between the magnetic particles and the refrigerant, i.e., the He gas. Further, when a proportion of such coarse particles exceeds 30% by weight, there may be a case where the cold accumulating performance is lowered. Accordingly, the average particle size is set to a range of 0.01 to 3 mm, more preferably, to a range of 0.03 to 1.0 mm, furthermore preferably, to a range of 0.05 to 0.5 mm.

To attain practically sufficient cooling functions and strength of the cold accumulating material, the proportion of particles having this size must be set to at least 70% by weight. Preferably, it is set to 80 wt. % or greater, more preferably, 90 wt. % or greater.

The oxygen concentration at the surface of the particulate cold accumulating substance (magnetic particle) is one of factors having a large influence upon the bonding strength between the cold accumulating substance and the binder, and the heat exchanging efficiency of the cold accumulating material. In the present invention, the oxygen concentration at an area ranging from a surface of the particulate cold accumulating substance to a portion having a depth of 100 angstrom (A) from the surface is controlled to be 5–80 at % (atomic %). When the oxygen concentration is less than 5 at %, the bonding strength between the particles and the binder is lowered. This phenomenon of lowering the bonding strength becomes particularly remarkable when the binder is organic type binding agents such as epoxy resin.

On the other hand, when the above oxygen concentration exceeds 80 at %, a thick oxide layer having a small thermal conductivity is liable to be formed on the surface of the particulate cold accumulating substance whereby the heat-exchange between He gas as the cooling medium gas and the cold accumulating material is disadvantageously obstructed. Accordingly, the above oxygen concentration is set to 5–80 at %. However, the range is preferably set to 10–75 at %, more preferably set to 20–70 at %.

By the way, the oxygen concentration at the area ranging from the surface of the particulate cold accumulating substance to the portion having a depth of 100 angstrom (A) from the surface can be easily measured, for example, by analytical methods such as auger emission spectroscopy (AES). Further, the method of controlling the oxygen concentration at the area ranging from the surface of the particulate cold accumulating substance to the portion having a depth of 100 angstrom (A) from the surface is not particularly limited.

However, for example, the aimed oxygen concentration can be obtained by controlling an atmosphere, by particularly controlling an oxygen concentration in the atmosphere at the working steps such as atomizing step or pulverizing step for working the magnetic material into the particulate cold accumulating substances (magnetic particles). In addition, the aimed oxygen concentration can be also obtained by working the magnetic material into particulate shape thereafter by holding the cold accumulating particles in air-atmosphere with a temperature of 100–300° C.

It is possible to form, based on the molten metal quenching method, particulate cold accumulating substances (magnetic particles) having extremely large strength and long life by setting the average crystal grain size of magnetic particles to 0.5 mm or smaller or by making at least part of the alloy structure amorphous.

The binder for mutually binding the particulate cold accumulating substances is not particularly limited. However, thermosetting resins such as epoxy type resins and polyimide or thermoplastic resins such as polyvinyl alcohol can be preferably used. In this regard, epoxy type resins can provide a high bonding strength at low temperature range, so that the epoxy type resins are particularly preferable.

After the particulate cold accumulating substances thus prepared and the above binder are mixed to form a mixture, the mixture is packed in an appropriate cylindrical vessel, and the binder is then solidified (cured or hardened) thereby to form a porous bulk-shaped cold accumulating material. In thus formed cold accumulating material, adjacent particulate cold accumulating substances are bonded, simultaneously, the particulate cold accumulating substances and the cylindrical vessel are integrally bonded through the binder.

The cylindrical vessel packed with the particulate cold accumulating substances as described above is loaded into a cold accumulating cylinder, then the cold accumulating cylinder is assembled into a refrigerator. In this regard, it is also possible to directly pack the mixture of the particulate cold accumulating substances and the binder into the cold accumulating cylinder without using the cylindrical vessel, then the binder is solidified. In this case, the cold accumulating particles can be more packed into the cold accumulating cylinder at larger amount corresponding to a volume of the cylindrical vessel, thus being advantageous.

In the present invention, the shape and particle size of the above particulate cold accumulating substances and the method of mixing the cold accumulating substances and binder are improved and optimized, so that there can be secured a porosity and a pore distribution enabling He gas as the cooling medium to smoothly pass through the cold accumulating material and to sufficiently heat exchange with the cold accumulating material.

By the way, as described hereinbefore, in a case where the particulate cold accumulating substances and the binder are simply mixed, a great part of the particulate cold accumulating substances are liable to bunch up together to form a particles-lump, so that the porosity of the lump is remarkably lowered and there is provided only a cold accumulating material having an improper pore distribution. On the other hand, when the addition amount of the binder is decreased so as not to lower the porosity and to form pores each having a sufficient size, there is posed a problem that the bonding strength between the particulate cold accumulating substances is lowered. As a result, there may be provided only a cold accumulating material which is easily destroyed during the operation of the refrigerator thereby to abruptly progress the pulverization of the cold accumulating material.

To solve the above problem, the present invention adopts the following improvement and contrivance for the purpose of securing a proper pores between the particulate cold accumulating substances and pore distribution, simultaneously, maintaining a proper bonding strength, by uniformly dispersing a small amount of the binder. That is, at first, the particulate cold accumulating substances were subjected to a surface treatment, thereby to increase the bonding strength between the binder and the particulate cold accumulating substances. The concrete examples of the above surface treatment may include a surface reforming method in which a coating film is formed on surfaces of the particulate cold accumulating substances. The coupling agent described above is appropriately selected in accordance with a combination of a kind of the cold accumulating substances and the binder. In particular, titanate type and aluminum type coupling agent are preferable.

In a case where a liquid binder is used, in order to secure the gaps and pores to be formed between the particulate cold accumulating substances, it is preferable to control a viscosity of the liquid binder. In a case where the liquid binder having a high viscosity is used, the binder is liable to locally disposed in the gaps between the particulate cold accumulating substances, so that the gaps are liable to be blocked up and clogged.

Therefore, it is preferable to lower the viscosity of the binder by adding thereto an appropriate solvent whereby the binder is uniformly dispersed in whole particulate cold accumulating substances. In this dispersed state of the binder, though the binder is dispersed in whole particulate cold accumulating substances, there may be a case where a part of the binder would form a film ranging between the adjacent particulate cold accumulating substances or extend so as to form a spider-web shape thereby to clog the gaps between the particulate substances.

To avoid the above phenomenon, after mixing the cold accumulating particles with the binder of which viscosity is controlled, it is effective to sufficiently evaporate or vaporize the binder. When the binder is evaporated, the binder extended between the adjacent particulate cold accumulating substances in a form of the film or the spider-web is cut thereby to effectively secure the gaps and pores among the particulate cold accumulating substances.

On the other hand, in a case where a powdery binder is used, when the grain size of the binder is controlled, it becomes possible to easily secure the gaps and pores among between the particulate cold accumulating substances, More concretely, in order to secure the predetermined porosity and pore distribution, an average grain size of the binder is preferably controlled to be smaller than the particle diameter of the particulate cold accumulating substances. In particular, the average grain size of the binder is preferably set to ½ or less of the particle diameter of the particulate cold accumulating substances, and more preferably set to ⅕ or less.

Further, when a shape of the particulate cold accumulating substance is controlled, it becomes possible to control the porosity and the pore distribution of the cold accumulating material prepared by bonding the cold accumulating particles through the binder. In this regard, in general, when the particulate cold accumulating substance having a high sphericity is used, the porosity of the cold accumulating material prepared by bonding the cold accumulating particles through the binder is lowered and the pores are formed to be fine.

On the other hand, when the particulate cold accumulating substances having a high aspect ratio such as flake-shaped, scale-shaped or needle-shaped cold accumulating particles are used, the porosity and pore diameter of the resultant cold accumulating material prepared by bonding the cold accumulating particles through the binder are increased. Therefore, when a mixing ratio of the particles having a high sphericity with the particles having a high aspect ratio is controlled, it is also possible to control the percentage of gaps and the porosity of the cold accumulating material.

In this regard, in case of an irregularly-shaped cold accumulating particles obtained by mechanically pulverizing an ingot of magnetic material, the pulverized particles exhibit a middle performance between the particle having a high sphericity and the particle having a high aspect ratio. When the pulverizing method is appropriately selected, there can be formed the cold accumulating material having an arbitrary porosity or pore distribution each ranging from high to low. For example, when the particulate cold accumulating substances prepared by being pulverized with a large impact force are used, the porosity of the cold accumulating material is liable to be low while the pore diameter is liable to be large.

On the other hand, when the particulate cold accumulating substances prepared by being pulverized with a small impact force for a long time are used, the porosity of the resultant cold accumulating material is liable to be high while the pore diameter is liable to be small.

Further, the method of manufacturing the particulate cold accumulating substances having a high sphericity is not particularly limited. However, gas-atomizing method, centrifugal-spraying method, nozzle-dropping method or the like can be available. In addition, as a method of manufacturing the particulate cold accumulating substances having a high aspect ratio, for example, single-roll method, double-roll method, water-atomizing method or the like can be available.

The inventors of this invention controlled the shape of the particulate cold accumulating substance and the method of mixing the substance to the binder thereby to prepare various cold accumulating materials each having different porosity and pore distribution at a time after the binder is solidified, and conducted refrigerating tests using the respective cold accumulating materials.

As a result, particularly, when the porosity of the cold accumulating material was controlled to be 15–70 vol %, the inventors of this invention found that excellent refrigerating performances could be obtained. When the porosity of the cold accumulating material is less than 15%, the heat-exchange between the cold accumulating material and He gas as the cooling medium gas will be insufficient. In addition, the flow resistance of He gas passing through the cold accumulating material is increased thereby to lower the refrigerating performance. The particularly preferable range of the porosity is 15–44%, and more preferable range is 15–39%.

By the way, though a method of measuring the porosity of the cold accumulating material at a time after the binder is solidified is not particularly limited, for example, there can be adopted a method in which the cold accumulating material after the binder is solidified is dipped into liquids such as pure water or the like, and vacuum-degassed thereby to impregnate the pure water into the pores of the cold accumulating material, then the porosity is calculated on the basis of an amount of increased weight due to the impregnation of the pure water into the pores.

The diameter size of the pores existing in the cold accumulating material at a time after the binder is solidified is one of the factors having a great influence onto the performance of the refrigerator. In this regard, in the present invention, it is preferable to control a median diameter of the pores to be in a range of 10–300 µm. Namely, the inventors of this invention controlled the shapes of the particulate cold accumulating substances and the method of mixing the substances to the binder thereby to prepare various cold accumulating materials each having different pore distribution at a time after the binder is solidified, and conducted refrigerating tests using the respective cold accumulating materials.

As a result, particularly, when the median diameter in the pore distribution of the cold accumulating material was controlled to be 10–300 µm, the inventors of this invention also found that excellent refrigerating performances could be obtained.

When the above median diameter of the pores is less than 10 µm, it becomes difficult to secure flow passages having a sufficient size for He gas to pass through the cold accumulating unit, as well as an amount of He gas flowing into an expanding space of the refrigerator is remarkably lowered, so that it becomes difficult to generate cold.

On the other hand, when the above median diameter of the pores exceeds 300 µm, the heat-exchanging between He gas and the cold accumulating material will be insufficient thereby to lower the cold accumulating efficiency. Accordingly, the median diameter of the pores is set to a range of 10–300 µm, more preferably to a range of 15–100 µm, and further more preferably to a range of 20–80 µm.

In this regard, though the method of measuring the pores distribution in the cold accumulating material is not particularly limited, the pores distribution can be easily measured, for example, by a mercury-penetration method or the like.

The cold accumulation refrigerator of the present invention is constructed so as to comprise a plurality of cooling stages and magnetic cold accumulating material particles filled in at least part of a cold accumulating unit disposed in the refrigerator. For example, the cold accumulating material of this invention is filled in a cold accumulating unit disposed at a predetermined cooling stage. While, other filling spaces are filled with other cold accumulating material having a specific heat characteristic corresponding to the temperature distribution required for the cold accumulating unit.

According to the cold accumulating material thus constructed, the cold accumulating material has a structure in which the particulate cold accumulating substances are firmly bonded to each other through the binder, and there can be secured the gaps or pores enabling the cooling medium gas (He gas) to easily pass through the cold accumulating material and to perform the sufficient heat exchange between the cooling medium gas and the cold accumulating material, so that there can be provided a cold accumulating material having an improved mechanical strength and exhibits a stable refrigerating performance for a long time.

Further, when the cold accumulating material is filled in at least part of the cold accumulating unit for the refrigerator, there can be provided a refrigerator having a high refrigerating performance at low temperature range, and capable of maintaining a stable refrigerating performance for a long time.

Furthermore, in an MRI apparatus, a cryopump, a superconducting magnet for magnetic floating train, and a in-magnetic field single crystal pull-up apparatus, since, in all of them, performance of the refrigerator dominates the performance of each apparatus, an MRI apparatus, a cryopump, a superconducting magnet for magnetic floating train, and an in-magnetic field single crystal pull-up apparatus in which the above described refrigerators are assembled therein can exhibit excellent performances for a long term.

DESCRIPTION OF THE PREFERRED EMBODIMENTS

Next, the embodiments of the present invention will be described more concretely with reference to examples mentioned below.

EXAMPLE 1

A particulate cold accumulating substance composed of $HoCu_2$ was prepared by utilizing a centrifugal atomizing method i.e., a rotary disc plate (RDP) method. Thus prepared particles were then sieved and classified according to shape classification so as to select 200 g of spherical particles having particle diameter of 0.15–0.30 mm and an aspect ratio of 1.2 or less. Then, 0.2 wt % of a titanate type coupling agent (KR46B, trade name: PLENACT manufactured by Ajinomoto K.K.) was added to the selected cold accumulating particles and 40 ml of acetone as diluting solvent was further added thereto and mixed for 10 minutes to prepare a mixture. Then, after the added acetone was sufficiently evaporated, a liquid epoxy resin (2280C, manufactured by Three Bond K.K.) was added to the particulate cold accumulating substance at an amount of 5 wt % with respect to a total weight of the cold accumulating particles. Further, 40 ml of acetone was added and mixed for 10 minutes. Similarly, the added acetone was then sufficiently evaporated.

Then, the mixture of the particulate cold accumulating substances and the epoxy resin was filled into a cold accumulating cylinder having an inner diameter of 38 mm. Thereafter, the cylinder was heated to 120° C. for 3 hours and the epoxy resin was cured (hardened) thereby to prepare a cold accumulating material of Example 1. The porosity of the cold accumulating material of Example 1 was 16%.

Figure 1:
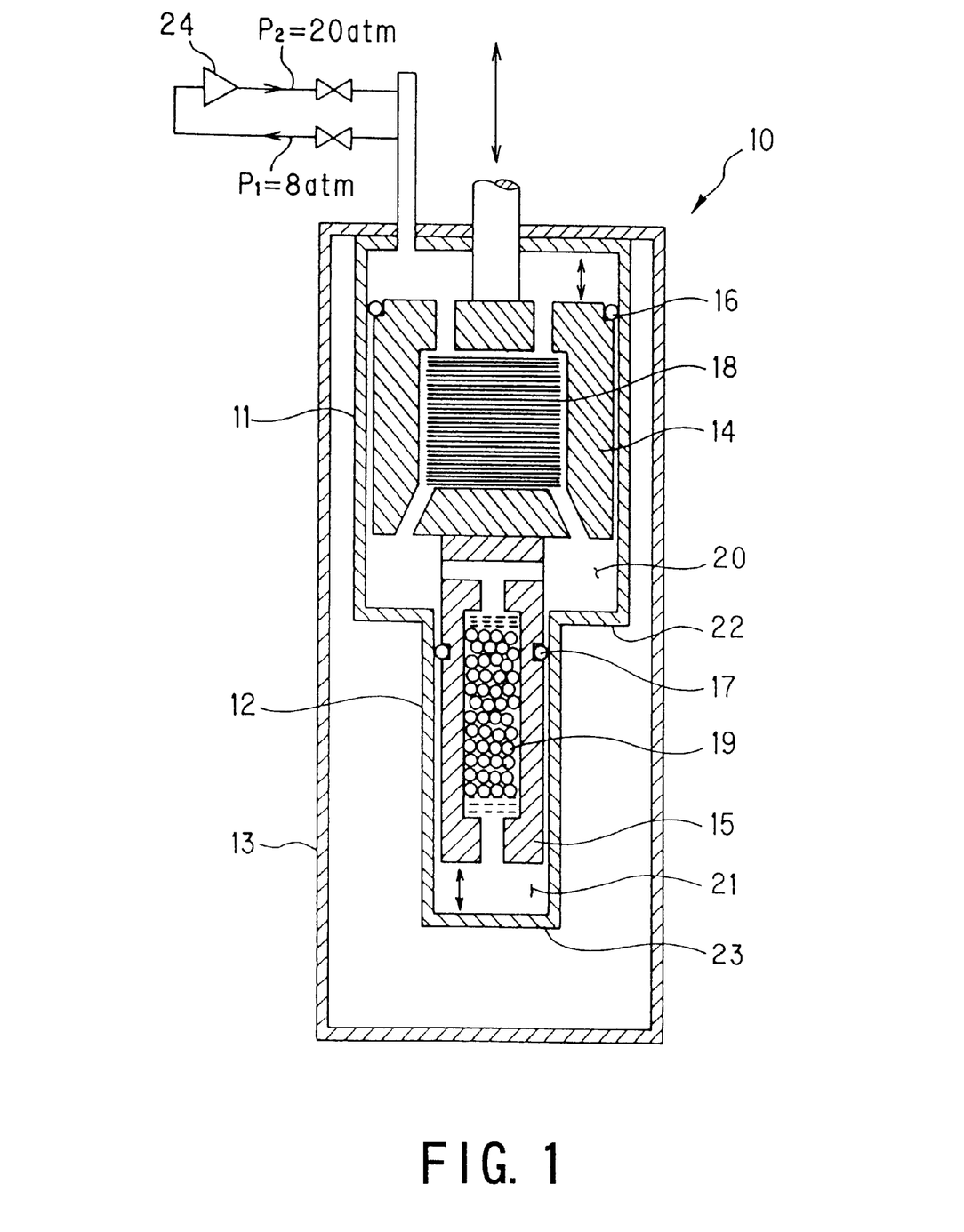
FIG. 1 is a cross sectional view showing an essential portion of a cold accumulation refrigerator (GM refrigerator) according to the present invention.

On the other hand, in order to evaluate the characteristics of thus prepared cold accumulating materials, there was prepared a two-staged expansion type GM refrigerator as shown in FIG. 1. In this regard, the two-staged expansion type GM refrigerator 10 shown in FIG. 1 is one embodiment of a refrigerator of this invention.

The two-staged expansion type GM refrigerator 10 shown in FIG. 1 has a vacuum container 13 containing a first cylinder 11 having a large diameter and a second cylinder 12 having a small diameter, which is connected coaxially to the first cylinder 11. The first cylinder 11 contains a first cold accumulating unit 14 which is freely reciprocatable and the second cylinder 12 also contains a second cold accumulating unit 15 which is freely reciprocatable. Seal rings 16, 17 are disposed between the first cylinder 11 and first cold accumulating unit 14, and between the second cylinder 12 and second cold accumulating unit 15, respectively.

The first cold accumulating unit 14 accommodates a first cold accumulating material 18 made of Cu mesh or the like. The low temperature side of the second cold accumulating unit 15 contains a second cold accumulating material 19 made of a cold accumulating material of this invention for extremely low temperature cold. The first cold accumulating unit 14 and second cold accumulating unit 15 have operating medium (refrigerant) paths for He gas or the like which are provided in gaps of the first cold accumulating material 18 and cold accumulating material 19 for extremely low temperature.

A first expansion chamber 20 is provided between the first cold accumulating unit 14 and second cold accumulating unit 15. A second expansion chamber 21 is provided between the second cold accumulating unit 15 and an end wall of the second cylinder 12. A first cooling stage 22 is provided on a bottom of the first expansion chamber 20 and further a second cooling stage 23 which is colder than the first cooling stage 22 is provided on a bottom of the second expansion chamber 21.

A high pressure operating medium (e.g., He gas) is supplied from a compressor 24 to the aforementioned two-staged GM refrigerator 10. The supplied operating medium passes through the first cold accumulating material 18 accommodated in the first cold accumulating unit 14 and reaches the first expansion chamber 20, and further passes through the second cold accumulating material (second cold accumulating material) 19 accommodated in the second cold accumulating unit 15 and reaches the second expansion chamber 21. At this time, the operating medium supplies heat energy to the respective first cold accumulating materials 18, 19 so that they are cooled.

The operating medium passing through the respective cold accumulating materials 18, 19 is expanded in the respective expansion chambers 20, 21 so as to produce cool atmosphere thereby cooling the respective cooling stages 22, 23. The expanded operating medium flows in the respective cold accumulating materials 18, 19 in opposite direction. The operating medium receives heat energy from the respective cold accumulating materials 18, 19 and is discharged. As recuperation effect is improved in this process, the refrigerator is constructed so that the heat efficiency of the operating medium cycle is improved whereby a further lower temperature is realized.

Then, thus prepared cold accumulating material of Example 1 was assembled as the second cold accumulating unit of the two-staged expansion type GM refrigerator, thereby to assemble a refrigerator according to Example 1, and a refrigeration test was carried out. A refrigerating capacity of the refrigerator at temperature of 4.2K was measured. The results are shown in FIG. 1.

Note, the refrigerating capacity in the respective Examples is defined as a heat load at a time when a heat load supplied from a heater is applied to the second cooling stage during the operation of the refrigerator and a temperature rise in the second cooling stage is stopped at 4.2K.

As a result, a refrigerating capacity of 1.11 W at 4.2K was obtained. In addition, after the completion of the refrigerating test, when the cold accumulating material packed in the cold accumulating unit of the refrigerator was took out from the unit and an appearance of the material was observed, any damage was not found at all to the cold accumulating material.

EXAMPLE 2

An alloy ingot having a composition of $HoCu_2$ for Example 2 was prepared by high frequency melting method. Thus obtained ingot was roughly pulverized by means of a jaw crusher to prepare roughly pulverized powder having a grain size of 2–3 mm. Then, obtained pulverized grains were finely pulverized by means of a ball mill for 12 hours. The obtained powder was then sieved so as to select 200 g of the irregularly-shaped particulate cold accumulating substances having particle diameter of 0.15–0.30 mm. Thereafter, as the same manner as in Example 1, the particulate cold accumulating substances were mixed with the epoxy resin as the binder to form a mixture, and the resin was cured in the cold accumulating cylinder, thereby to prepare the cold accumulating material according to Example 2. In this regard, the addition amount of the epoxy resin was set to 3 wt % with respect to a total weight of the particulate cold accumulating substances. The porosity of the cold accumulating material was 39%. With respect to the cold accumulating material, a refrigerating test was conducted under the same conditions as in Example 1, and a refrigerating capacity at 4.2K was measured. the measured value is shown in Table 1.

EXAMPLE 3

As the same manner in Example 2, an alloy ingot having a composition of $HoCu_2$ was prepared. After the ingot was roughly pulverized, the pulverized ingot was further finely pulverized by means of a hammer mill to prepare finely pulverized powder. Thus obtained finely pulverized powder was then sieved so as to select 200 g of the particulate cold accumulating substances having an irregularly-shape and particle diameter of 0.15–0.30 mm. Thereafter, as the same manner as in Example 2, the particulate cold accumulating substances were mixed with the epoxy resin as the binder to form a mixture, and the resin was cured in the cold accumulating cylinder, thereby to prepare the cold accumulating material according to Example 3. In this regard, the porosity of the cold accumulating material was 44%. With respect to the cold accumulating material, the refrigerating test was conducted under the same conditions as in Example 1, and a refrigerating capacity at 4.2K was measured. The measured value is shown in Table 1.

EXAMPLE 4

A rapidly-quenched cold accumulating substance having a flake-shape and an alloy composition of $HoCu_2$ was prepared by utilizing a single roll method. Thus obtained flake-shaped cold accumulating substance was finely pulverized by means of a ball mill for 3 hours. Thereafter, thus obtained finely pulverized powder was sieved so as to select 200 g of the particulate cold accumulating substances having a flake-shape and particle diameter of 0.15–0.30 mm. Thereafter, as the same manner as in Example 2, the cold accumulating material according to Example 4 was prepared. In this regard, the porosity of the cold accumulating material was 68%. With respect to this cold accumulating material, the refrigerating test was conducted under the same conditions as in Example 1, and a refrigerating capacity at 4.2K was measured thereby to obtain the result shown in Table 1.

COMPARATIVE EXAMPLE 1

As the same manner as in Example 2, a particulate cold accumulating substance having an irregular-shape and an alloy composition of $HoCu_2$ was prepared. Thus obtained irregularly-shaped cold accumulating substance was packed into the cold accumulating unit used in Example 2. The epoxy resin used in Example 2 was diluted with 40 ml of acetone to prepare a resin solution. An amount of the epoxy resin corresponded to 3 wt % of a weight of the particulate cold accumulating substance. Then, the resin solution was poured into the cold accumulating unit in which $HoCu_2$ particles having irregular-shape were packed. The poured and diluted solution of the epoxy resin adhered to gaps between the adjacent $HoCu_2$ particles, and flowed out from a He gas delivery nozzle. Further, in order to remove an excess amount of the epoxy resin, A high-pressured nitrogen gas was injected into the cold accumulating unit. The pouring operation and the removing operation of the epoxy resin were repeated five times over, thereby to prepare a cold accumulating material of Comparative Example 1. In this regard, the porosity of the cold accumulating material was 13%. With respect to this cold accumulating material, the refrigerating test was conducted under the same conditions as in Example 1, and a refrigerating capacity at 4.2K was measured thereby to obtain the result shown in Table 1.

COMPARATIVE EXAMPLE 2

The cold accumulating substances were treated as the same manner as in Example 4 except that the particle diameter of the flake-shaped particulate cold accumulating substance was set to be coarse so as to have a particle diameter of 0.30–0.50 mm, thereby to prepare a cold accumulating material of Comparative Example 2. Then, this cold accumulating material was packed in a cold accumulating unit. In this regard, the porosity of the cold accumulating material was 72%. With respect to this cold accumulating material, the refrigerating test was conducted under the same conditions as in Example 1, and a refrigerating capacity at 4.2K was measured thereby to obtain the result shown in Table 1.

TABLE 1

| Sample No. | Porosity (%) | Refrigerating Capacity at 4.2K (W) |
| --- | --- | --- |
| Example 1 | 16 | 1.11 |
| Example 2 | 39 | 1.17 |
| Example 3 | 44 | 0.84 |
| Example 4 | 68 | 0.72 |
| Comparative Example 1 | 13 | 0.45 |
| Comparative Example 2 | 72 | 0.37 |

As is clear from the results shown in Table 1, in the refrigerators according to Examples 1–4 in which the porosity of the cold accumulating material is controlled to be in a predetermined range, the heat exchange between the He gas and the cold accumulating material can be smoothly performed, thereby to obtain a high refrigerating performance.

Further, according to the respective cold accumulating materials of Examples, the particulate cold accumulating substances are firmly bonded to each other through the binder, so that the particulate cold accumulating materials are free from being finely pulverized during the operation of the refrigerator and free from dropping from the cold accumulating unit, whereby there can be obtained a cold accumulating material and a refrigerator having stable characteristics.

On the other hand, in the refrigerators according to Comparative Examples 1–2 in which the porosity of the cold accumulating material is excessively small or excessively large, the heat exchange between the He gas and the cold accumulating material can not be smoothly performed, so that it was confirmed that the refrigerating performance was lowered.

EXAMPLE 5

A particulate cold accumulating substance having an average particle diameter of 228 μm was prepared by carrying out the coupling treatment as the same manner as in Example 1, and the epoxy resin powder having an average grain size of 20 μm (trade name: Epiform EPX-6136 manufactured by Somal K.K.) was prepared. Then, the particulate cold accumulating substance and the epoxy resin powder were mixed for 10 minutes to prepare a mixture. The mixture of the particulate cold accumulating substance and the epoxy resin powder was packed into the cold accumulating cylinder as the same as in Example 1, and the epoxy resin was cured at 120° C. for 3 hours thereby to prepare a cold accumulating material of Example 5. The porosity of this cold accumulating material of Example 5 was 17%.

A refrigeration test was carried out as the same manner as in Example 1. As a result, a refrigerating capacity of 1.09W in the refrigerator at temperature of 4.2K was obtained.

COMPARATIVE EXAMPLE 3

The cold accumulating substances were treated as the same manner as in Example 5 except that the grain size of the epoxy resin powder was set to 140 μm, thereby to prepare a cold accumulating material of Comparative Example 3. The porosity of this cold accumulating material was 12%. With respect to this cold accumulating material, the refrigerating test was conducted under the same conditions as in Example 1, and a refrigerating capacity of 0.48W at 4.2K was obtained.

As is clear from Example 5 and Comparative Example 3, in a case where the average grain size (particle diameter) of the powdery binder is ½ or less of an average grain size of the particulate cold accumulating substance, the gaps between the adjacent particulate cold accumulating substances can be sufficiently secured, so that the heat exchange between He gas and the cold accumulating material can be smoothly performed, whereby a high refrigerating capacity can be obtained.

Next, the influences of the shape or the like of the particulate cold accumulating material on the refrigerating capacity and durability of the refrigerator will be explained in more detail with reference to the following Examples.

A mother alloy having a composition of $HoCu_2$ was prepared in accordance with the high frequency melting method. Then, the mother alloy was melted at a temperature of 1350K to prepare a molten alloy. The molten alloy was dropped on a rotating disc (rotating speed: $1 \times 10^4$ rpm) in an Ar atmosphere having a pressure of 90 KPa, and rapidly quenched and solidified thereby to prepare magnetic particles. From thus obtained magnetic particles, the magnetic particles having grain size of 0.15–0.25 mm were selected by sieving method. The selected magnetic particles was then classified according to shape classification using a slant belt conveyer so as to select 200 g of particulate cold accumulating substances having a high roundness. Then, a hundred of particles were randomly selected from the classified particles, and the hundred of particles were subjected to an image analysis. As a result, a ratio of the particles each having a shape factor of 1.0–5.0 was 98%.

With respect to thus obtained particulate cold accumulating substances, 0.3 wt % of a titanate type coupling agent (KR46B, trade name: PLENACT manufactured by Ajinomoto K.K.) was added. Then, 40 ml of acetone as diluting solvent was further added thereto and mixed for 10 minutes to prepare a mixture. Then, after the added acetone was sufficiently evaporated, a liquid epoxy resin (2280C, manufactured by Three Bond K.K.) was added to the particulate cold accumulating substance at an amount of 3 wt % with respect to a total weight of the cold accumulating particles. Further, 30 ml of acetone was added and mixed for 10 minutes. Thereafter, similarly, the added acetone was sufficiently evaporated.

Then, the mixture of the particulate cold accumulating substances and the epoxy resin was filled into a cold accumulating cylinder having an inner diameter of 38 mm. Thereafter, the cylinder was heated to 120° C. for 3 hours and the epoxy resin was cured thereby to prepare a cold accumulating material of Example 6. The cold accumulating material was packed thereby to prepare a cold accumulating unit. The porosity of the cold accumulating material of Example 6 was 28%.

This cold accumulating unit was assembled into the two-staged expansion type GM refrigerator shown in FIG. 1 as a second cold accumulating unit, and the refrigeration test was carried out. As a result, a refrigerating capacity at 4.2K was 1.23W. Further, Even after the refrigerator was continuously operated for 3000 hours, there was no change in the refrigerating capacity. In addition, when the refrigerator was stopped and the cold accumulating unit was dismantled so as to examine the state of the cold accumulating material, a generation of fine powders due to breakage of the cold accumulating material was not observed at all.

EXAMPLE 7

An alloy ingot composed of $HoCu_2$ alloy for Example 7 was prepared by high frequency melting method. Thus obtained ingot was roughly pulverized by means of a jaw crusher to prepare roughly pulverized grains having a grain size of 2–3 mm. Then, obtained pulverized grains were further finely pulverized by means of a hammer mill in an atmosphere of Ar. The pulverized powders were accommodated into a pot of a ball mill and were furthermore pulverized without using balls as pulverizing media. Thus obtained pulverized powder was then sieved so as to select 200 g of the particulate cold accumulating substances having particle diameter of 0.25–0.30 mm. Then, a hundred of particles were randomly selected from the selected particles, and the hundred of particles were subjected to an image analysis. As a result, a ratio of the particles each having a shape factor of 1.0–5.0 was 96%.

Hereinafter, using the above particulate cold accumulating substances, a cold accumulating unit for Example 7 was prepared as the same manner as in Example 5. As a result, the porosity of the cold accumulating material of Example 7 was 35%. With respect to the cold accumulating unit, the refrigeration test was carried out under the same conditions as in Example 6. As a result, a refrigerating capacity at 4.2K was 1.19W. Further, even after the refrigerator was continuously operated for 3000 hours, there was no change in the refrigerating capacity. In addition, when the refrigerator was stopped and the cold accumulating unit was dismantled so as to examine the state of the cold accumulating material, a generation of fine powders due to breakage of the cold accumulating material was not observed at all.

EXAMPLE 8

The particulate cold accumulating substances were prepared as the same manner as in Example 5 except that the shape classification of the particulate cold accumulating substances were not conducted, thereby to prepare a cold accumulating material of Example 8. Then, a hundred of particles were randomly selected from the particles, and the hundred of particles were subjected to an image analysis. As a result, a ratio of the particles each having a shape factor of 1.0–5.0 was 74%.

Hereinafter, using the above particulate cold accumulating substances, a cold accumulating unit for Example 8 was prepared as the same manner as in Example 5. As a result, the porosity of the cold accumulating material of Example 8 was 36%. With respect to the cold accumulating unit, the refrigeration test was carried out under the same conditions as in Example 6. As a result, an initial refrigerating capacity at 4.2K was 1.20W. However, after the refrigerator was continuously operated for 3000 hours, the refrigerating capacity at 4.2K was lowed to be 0.60W. In addition, when the refrigerator was stopped and the cold accumulating unit was dismantled so as to examine the state of the cold accumulating material, a generation of fine powders due to breakage of the cold accumulating material was observed, and the seal portion of the refrigerator was found to be broken due to the fine powders.

EXAMPLE 9

The particulate cold accumulating substances were prepared as the same manner as in Example 6 except that the ball-mill pulverization using balls as pulverizing media was conducted, thereby to prepare a cold accumulating material of Example 9. Then, a hundred of particles were randomly selected from the particles, and the hundred of particles were subjected to an image analysis. As a result, a ratio of the particles each having a shape factor of 1.0–5.0 was 66%.

Hereinafter, using the above particulate cold accumulating substances, a cold accumulating unit for Example 9 was prepared as the same manner as in Example 6. As a result, the porosity of the cold accumulating material of Example 9 was 39%. With respect to the cold accumulating unit, the refrigeration test was carried out under the same conditions as in Example 7. As a result, an initial refrigerating capacity at 4.2K was 1.19W. However, after the refrigerator was continuously operated for 3000 hours, the refrigerating capacity at 4.2K was lowed to be 0.55W. In addition, when the refrigerator was stopped and the cold accumulating unit was dismantled so as to examine the state of the cold accumulating material, a generation of fine powders due to breakage of the cold accumulating material was observed, and the seal portion of the refrigerator was found to be broken due to the fine powders.

As is clear from Examples 6–9, according to the respective cold accumulating materials of Examples 6–9 containing a predetermined amount or more of the particulate cold accumulating substances having a specified shape factor, the cold accumulating materials are free from being finely pulverized during the operation of the refrigerator and free from dropping from the cold accumulating unit, so that there can be obtained a refrigerator having stable refrigerating characteristics.

On the other hand, in case of the cold accumulating material according to Examples 8–9 in which the ratio of the particulate cold accumulating substances having the specified shape factor is relatively low, it was confirmed that the cold accumulating material was liable to be finely pulverized and the refrigerating capacity of the refrigerator was also liable to be lowered.

Next, an influence of sizes of the pores existing in the cold accumulating material on the refrigerating characteristics and durability of the refrigerator will be explained in more detail with reference to the following Examples.

EXAMPLE 10

A spherical and particulate cold accumulating substance composed of $HoCu_2$ was prepared by utilizing a centrifugal atomizing method i.e., a rotary disc plate (RDP) method. Thus prepared particles were then sieved and classified according to shape classification so as to select 200 g of spherical particles having particle diameter of 0.125–0.15 mm and an aspect ratio of 1.2 or less. Then, 0.3 wt % of a titanate type coupling agent (KR46B, trade name: PLENACT manufactured by Ajinomoto K.K.) was added to the selected cold accumulating particles and 40 ml of acetone as diluting solvent was further added thereto and mixed for 10 minutes to prepare a mixture. Then, after the added acetone was sufficiently evaporated, a liquid epoxy resin (2280C, manufactured by Three Bond K.K.) was added to the particulate cold accumulating substance at an amount of 3 wt % with respect to a total weight of the cold accumulating particles. Further, 30 ml of acetone was further added and mixed for 10 minutes. Similarly, the added acetone was then sufficiently evaporated.

Then, the mixture of the particulate cold accumulating substances and the epoxy resin was filled into a cold accumulating cylinder having an inner diameter of 38 mm. Thereafter, the cylinder was heated to 120° C. for 3 hours and the epoxy resin was cured thereby to prepare a cold accumulating material of Example 10. When the pore distribution of the cold accumulating material was measured by mercury penetration method, the median diameter of the pores was 22 $\mu$m and the porosity of the cold accumulating material of Example 10 was 21%.

This cold accumulating unit into which the cold accumulating material was packed was assembled into the two-staged expansion type GM refrigerator shown in FIG. 1 as a second cold accumulating unit, and the refrigeration test was carried out. As a result, a refrigerating capacity at 4.2K was measured thereby to obtain the result shown in Table 2.

EXAMPLE 11

An alloy ingot having a composition of $HoCu_2$ for Example 11 was prepared by high frequency melting method. Thus obtained ingot was roughly pulverized by means of a jaw crusher to prepare roughly pulverized powder having a grain size of 2–3 mm. Then, obtained pulverized grains were finely pulverized by means of a hammer mill. The obtained powder was then sieved so as to select 200 g of the particulate cold accumulating substances having irregular-shape and particle diameter of 0.25–0.30 mm. Thereafter, as the same manner as in Example 9, the particulate cold accumulating substances were mixed with the epoxy resin as the binder to form a mixture, and the resin was cured in the cold accumulating cylinder, thereby to prepare the cold accumulating material according to Example 11. The median diameter of the pores formed in the cold accumulating material was 79 $\mu$m and the porosity of the cold accumulating material was 41%. With respect to the cold accumulating material, a refrigerating test was conducted under the same conditions as in Example 9, and a refrigerating capacity at 4.2K was measured thereby to obtain a result shown in Table 2.

EXAMPLE 12

The particulate cold accumulating substances composed of $HoCu_2$ prepared under the same conditions as in Example 1 were sieved and classified according to shape classification so as to select 200 g of spherical and particulate cold accumulating substances having particle diameter of 1.0–2.0 mm. Thereafter, as the same manner as in Example 1, the particulate cold accumulating substances were treated to form a cold accumulating material of Example 12 and this material was packed into a cylinder to prepare a cold accumulating unit. When the pore distribution of the cold accumulating material was measured by the mercury penetration method, the median diameter of the pores was 314 $\mu$m and the porosity of the cold accumulating material of Example 12 was 24%. With respect to the above cold accumulating unit, a refrigerating test was conducted under the same conditions as in Example 1. As a result, a refrigerating capacity at 4.2K was 0.43W.

COMPARATIVE EXAMPLE 4

As the same manner as in Example 11, a particulate cold accumulating substance having an irregular-shape and an alloy composition of $HoCu_2$ was prepared. Thus obtained irregularly-shaped cold accumulating substance was packed into the cold accumulating unit used in Example 11. The epoxy resin used in Example 11 was diluted with 30 ml of acetone to prepare a resin solution. An amount of the epoxy resin corresponds to 3 wt % of a total weight of the particulate cold accumulating substance. Then, the resin solution was poured into the cold accumulating unit in which $HoCu_2$ particles having the irregular-shape were packed. The poured and diluted solution of the epoxy resin adhered to gaps between the adjacent $HoCu_2$ particles, and flowed out from a He gas delivery nozzle. Further, in order to remove an excess amount of the epoxy resin, high-pressured nitrogen gas was injected into the cold accumulating unit. The pouring operation and the removing operation of the epoxy resin were repeated seven times over, thereby to prepare a cold accumulating material of Comparative Example 4. In this regard, a median diameter of the pore distribution in the cold accumulating material was measured to be 3.8 $\mu$m and the porosity of the cold accumulating material was 12 vol %. With respect to this cold accumulating material, the refrigerating test was conducted under the same conditions as in Example 10, and a refrigerating capacity at 4.2K was measured thereby to obtain the result shown in Table 2.

COMPARATIVE EXAMPLE 5

A rapidly-quenched cold accumulating substance having a flake-shape and an alloy composition of $HoCu_2$ was prepared by utilizing a single roll method. Thus obtained flake-shaped cold accumulating substance was finely pulverized by means of a ball mill for one hour. Thereafter, thus obtained finely pulverized powder was sieved so as to select 200 g of the particulate cold accumulating substances having a flake-shape and particle diameter of 0.35–0.50 mm. Thereafter, as the same manner as in Example 10, the cold accumulating material according to Comparative Example 5 was prepared. In this regard, the median diameter of pore distribution of this cold accumulating material was 330 μm and the porosity of the cold accumulating material was 74%. With respect to this cold accumulating material, the refrigerating test was conducted under the same conditions as in Example 10, and a refrigerating capacity at 4.2K was measured thereby to obtain the result shown in Table 2 hereunder.

TABLE 2

| Sample No. | Median Diameter (μm) | Refrigerating Capacity at 4.2K (W) |
|---|---|---|
| Example 10 | 22 | 1.20 |
| Example 11 | 79 | 0.93 |
| Comparative Example 4 | 8 | 0.32 |
| Comparative Example 5 | 330 | 0.27 |

As is clear from the results shown in Table 2, according to the cold accumulating materials of Examples 10 and 11 in which the median diameter of pore distribution in the cold accumulating material is controlled to be within a predetermined range, it was confirmed that the refrigerating capacity can be increased in comparison with the cold accumulating materials of Comparative Examples 4 and 5 of which median diameter is outside the range.

Next, an influence of a level of an oxygen concentration at surface of the particulate cold accumulating substance on the refrigerating capacity and durability of the cold accumulating material will be explained in more detail with reference to the following Examples.

EXAMPLE 13

A mother alloy having a composition of $HoCu_2$ was prepared in accordance with the high frequency melting method. Then, the mother alloy was melted at a temperature of 1350K to prepare a molten alloy. The molten alloy was dropped on a rotating disc (rotating speed: $1\times10^4$ rpm) in a chamber of a rapidly quenching apparatus. The chamber was filled with an Ar atmosphere having a pressure of 90 KPa. The molten alloy was rapidly quenched and solidified thereby to prepare magnetic particles. Just after the solidification, oxygen gas was injected into the chamber till the oxygen concentration in the chamber became 5 vol %. Then, after the magnetic particles were sufficiently cooled, and the magnetic particles were taken out from the chamber.

From thus obtained magnetic particles, 200 g of the magnetic particles having grain size of 0.125–0.15 mm were selected by sieving method. With respect to the selected magnetic particles, oxygen concentrations in a range from a surface of the particulate cold accumulating substance (magnetic particle) to a portion having a depth of 100 angstrom (calculated as $SiO_2$) from the surface were measured by means of auger emission spectroscopy (AES). As a result, an oxygen concentration at a portion close to the surface was 57 at %, the oxygen concentration was monotonously decreased in a depth direction, and an oxygen concentration at a portion having a depth of 100 angstrom from the surface was 34 at %.

With respect to thus obtained particulate cold accumulating substances, 0.3 wt % of a titanate type coupling agent (KR46B, trade name: PLENACT manufactured by Ajinomoto K.K.) was added. Then, 40 ml of acetone as diluting solvent was further added thereto and mixed for 10 minutes to prepare a mixture. Then, after the added acetone was sufficiently evaporated, a liquid epoxy resin (2280C, manufactured by Three Bond K.K.) was added to the particulate cold accumulating substance at an amount of 3 wt % with respect to a total weight of the cold accumulating particles. Further, 30 ml of acetone was further added and mixed for 10 minutes. Thereafter, similarly, the added acetone was sufficiently evaporated.

Then, the mixture of the particulate cold accumulating substances and the epoxy resin was filled into a cold accumulating cylinder having an inner diameter of 38 mm. Thereafter, the cylinder was heated to 120° C. for 3 hours and the epoxy resin was cured thereby to prepare a cold accumulating material of Example 13. The cold accumulating material was packed thereby to prepare a cold accumulating unit. The porosity of the cold accumulating material of Example 13 was 23%.

This cold accumulating unit was assembled into the two-staged expansion type GM refrigerator shown in FIG. 1 as a second cold accumulating unit, and the refrigeration test was carried out. As a result, a refrigerating capacity at 4.2K was 1.21W. Further, Even after the refrigerator was continuously operated for 3000 hours, there was no change in the refrigerating capacity. In addition, when the refrigerator was stopped and the cold accumulating unit was dismantled so as to examine the state of the cold accumulating material, a generation of fine powders due to breakage of the cold accumulating material was not observed at all.

EXAMPLE 14

An alloy ingot composed of $HoCu_2$ alloy for Example 14 was prepared by high frequency melting method. Thus obtained ingot was roughly pulverized by means of a jaw crusher to prepare roughly pulverized particles having a grain size of 2–3 mm. Then, thus obtained particles were further finely pulverized by means of a hammer mill in an atmosphere of Ar. At a time just after completion of the pulverization, the pulverized powders attained to a high temperature due to shocks caused during the pulverizing operation. In this state, before the pulverized powders were cooled, air was introduced into a powder recovering vessel whereby the pulverized powders were cooled in the air. Thus obtained pulverized powder was then sieved so as to select 200 g of the particulate cold accumulating substances having an irregular-shape and particle diameter of 0.25–0.30 mm.

Then, with respect to the selected magnetic particles, oxygen concentrations in a range from a surface of the particulate cold accumulating substance (magnetic particle) to a portion having a depth of 100 angstrom (calculated as $SiO_2$) from the surface were measured by means of auger emission spectroscopy (AES). As a result, an oxygen concentration at a portion close to the surface was 56 at %, the oxygen concentration was monotonously decreased in a depth direction, and an oxygen concentration at a portion having a depth of 100 angstrom from the surface was 40 at %.

Hereinafter, using the above particulate cold accumulating substances, a cold accumulating unit for Example 14 was prepared as the same manner as in Example 11. As a result, the porosity of the cold accumulating material of Example 14 was 42%. With respect to the cold accumulating unit, the refrigeration test was carried out under the same conditions as in Example 11. As a result, a refrigerating capacity at 4.2K was 0.94W. Further, even after the refrigerator was continuously operated for 3000 hours, there was no change in the refrigerating capacity. In addition, when the refrigerator was stopped and the cold accumulating unit was dismantled so as to examine the state of the cold accumulating material, a generation of fine powders due to breakage of the cold accumulating material was not observed at all.

EXAMPLE 15

The particulate cold accumulating substances for Example 15 were prepared as the same manner as in Example 13 except that the magnetic particles were cooled in Ar atmosphere without introducing oxygen gas into the chamber just after the molten $HoCu_2$ alloy was rapidly quenched and solidified.

Then, with respect to the prepared magnetic particles, an oxygen concentration at a portion having a depth of 100 angstrom (calculated as $SiO_2$) from the surface of the particles was measured by means of auger emission spectroscopy (AES). As a result, the oxygen concentration was 3 at %.

Hereinafter, using the above particulate cold accumulating substances, a cold accumulating unit for Example 15 was prepared as the same manner as in Example 11. As a result, the porosity of the cold accumulating material of Example 15 was 24%. With respect to the cold accumulating unit, the refrigeration test was carried out. As a result, an initial refrigerating capacity at 4.2K was 1.20W. However, after the refrigerator was continuously operated for 3000 hours, the refrigerating capacity at 4.2K was lowered to be 0.54W. In addition, when the refrigerator was stopped and the cold accumulating unit was dismantled so as to examine the state of the cold accumulating material, a generation of fine powders due to breakage of the cold accumulating material was observed, and the seal portion of the refrigerator was found to be broken due to the fine powders.

EXAMPLE 16

The particulate cold accumulating substances for Example 16 were prepared as the same manner as in Example 12 except that the magnetic particles were cooled in Ar atmosphere without introducing oxygen gas into the chamber just after the molten $HoCu_2$ alloy was rapidly quenched and solidified.

Then, with respect to the prepared magnetic particles, an oxygen concentration at a portion having a depth of 100 angstrom (calculated as $SiO_2$) from the surface of the particles was measured by means of auger emission spectroscopy (AES). As a result, the oxygen concentration was 4 at %.

Hereinafter, using the above particulate cold accumulating substances, a cold accumulating unit for Example 16 was prepared as the same manner as in Example 11. As a result, the porosity of the cold accumulating material of Example 16 was 43%. With respect to the cold accumulating unit, the refrigeration test was carried out. As a result, an initial refrigerating capacity at 4.2K was 0.94W. However, after the refrigerator was continuously operated for 3000 hours, the refrigerating capacity at 4.2K was lowered to be 0.44 W. In addition, when the refrigerator was stopped and the cold accumulating unit was dismantled so as to examine the state of the cold accumulating material, a generation of fine powders due to breakage of the cold accumulating material was observed, and the seal portion of the refrigerator was found to be broken due to the fine powders.

As is clear from Examples 11–14, according to the respective cold accumulating materials of Examples 11–12 in which the oxygen concentration at surface of the particulate cold accumulating substance was controlled to be within a predetermined range, it was confirmed that the bonding strength between the cold accumulating substances was increased, so that the cold accumulating materials were free from being finely pulverized and there can be obtained excellent refrigerating characteristics.

Next, embodiments of a superconductive MRI apparatus, a superconducting magnet for magnetic floating train, a cryopump, and an in-magnetic field type single crystal pull-up apparatus of the present invention, will be described.

Figure 2:
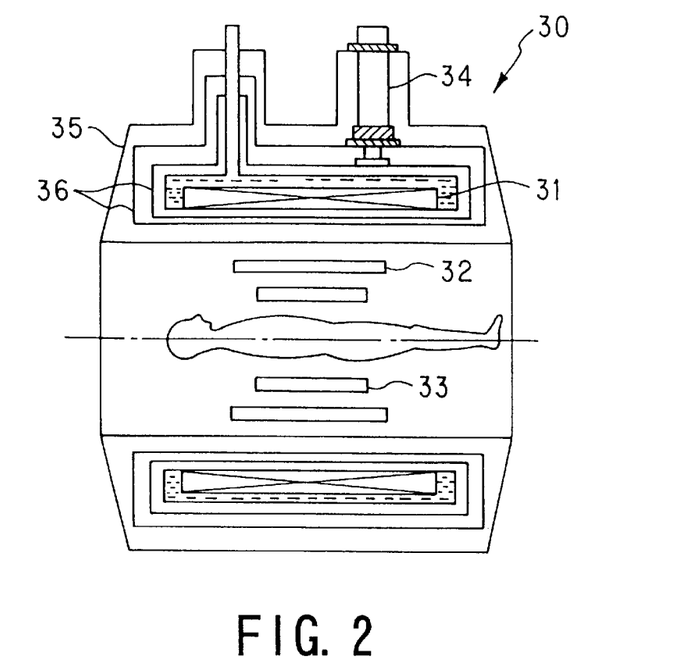
FIG. 2 is a cross sectional view outlining the structure of a superconductive MRI apparatus according to one embodiment of the present invention.

FIG. 2 is a cross sectional view outlining a structure of a superconductive MRI apparatus to which the present invention is applied. The superconductive MRI apparatus 30 shown in FIG. 2 is constituted of a superconductive magnetostatic field coil 31 for biasing a spatially homogeneous and a temporally stable magnetostatic field to a human body, a not shown compensating coil for compensating inhomogeneity of generating magnetic field, a gradient magnetic field coil 32 for providing a magnetic field gradient in a measuring region, and a probe for radio wave transducer 33. And, to cool the superconductive magnetostatic field coil 31, the above described cold accumulation refrigerator 34 of the present invention is employed. Incidentally, in the figure, numeral 35 denotes a cryostat, numeral 36 denotes a radiation shield.

In the superconductive MRI apparatus 30 wherein a cold accumulation refrigerator 34 of the present invention is applied, since an operating temperature of the superconductive magnetostatic field coil 31 can be guaranteed to be stable over a long term, a spatially homogeneous and temporally stable magnetostatic field can be obtained over a long term. Therefore, performance of a superconductive MRI apparatus 30 can be exhibited with stability over a long term.

Figure 3:
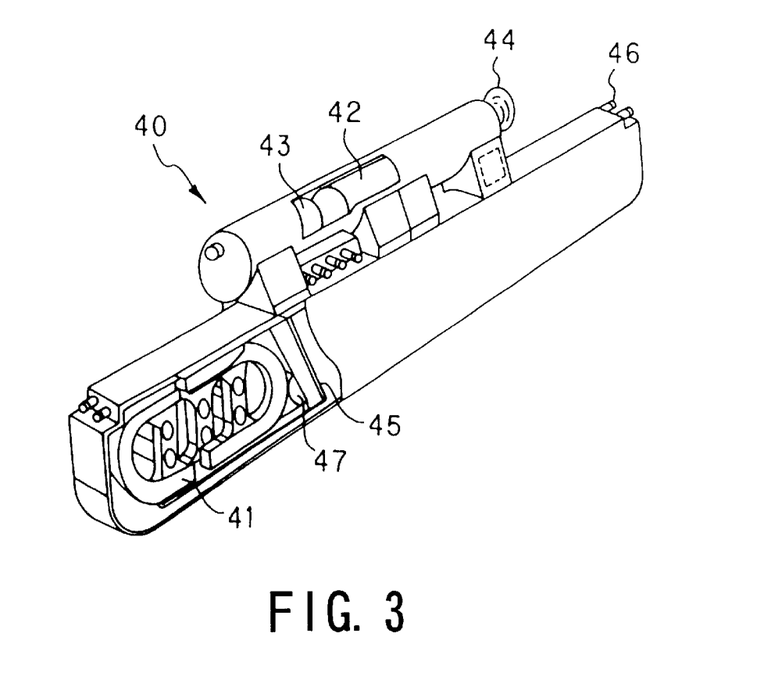
FIG. 3 is a perspective view outlining the essential structure of a superconducting magnet (for magnetic floating train) according to one embodiment of the present invention.

FIG. 3 is a perspective view outlining a structure of an essential portion of a superconducting magnet for magnetic floating train (magnetic levitation train) in which the cold accumulation refrigerator of the present invention is applied, a portion of a superconductive magnet 40 for a magnetic floating train being shown. The superconductive magnet 40 for a magnetic floating train shown in FIG. 3 is constituted of a superconductive coil 41, a liquid helium tank 42 for cooling the superconductive coil 41, a liquid nitrogen tank 43 for preventing evaporation of the liquid helium and a cold accumulating type refrigerator 44 of the present invention. Incidentally, in the figure, numeral 45 denotes a laminated adiathermic material, numeral 46 denotes a power lead, numeral 47 denotes a persistent current switch.

In a superconductive magnet 40 for a magnetic floating train wherein a cold accumulation refrigerator 44 of the present invention is employed, since the operation temperature of the superconductive coil 41 can be guaranteed to be stable over a long term, a magnetic filed necessary for magnetic levitation and propulsion of a train can be obtained over a long term with stability. In particular, although acceleration operates in the superconductive magnet 40 for a magnetic floating (levitation) train, the cold accumulation refrigerator 44 of the present invention, being able to maintain an excellent refrigeration performance over a long term even when the acceleration is operated, can remarkably contribute to the long term stability of the magnetic field and the like. Therefore, a magnetic floating train in which such a superconductive magnet 40 is employed can exhibit its reliability over a long term.

Figure 4:
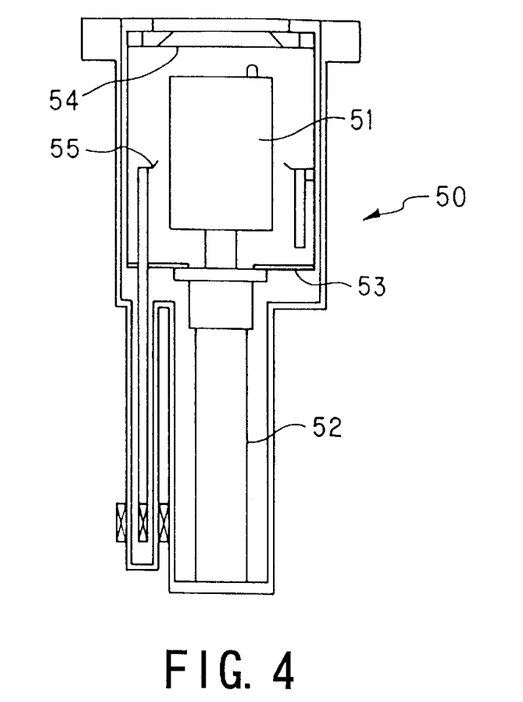
FIG. 4 is a cross sectional view outlining the structure of a cryopump according to one embodiment of the present invention.

FIG. 4 is a cross sectional view outlining a structure of a cryopump to which a cold accumulation refrigerator of the present invention is applied. A cryopump 50 shown in FIG. 4 is constituted of a cryopanel 51 for condensing or absorbing gas molecules, a cold accumulation refrigerator 52 of the present invention for cooling the cryopanel 51 to a predetermined extremely low temperature, a shield 53 disposed therebetween, a baffle 54 disposed at an intake nozzle, and a ring 55 for varying exhaust speed of Argon, nitrogen, hydrogen gas or the like.

With a cryopump 50 involving the cold accumulation refrigerator 52 of the present invention, the operating temperature of the cryopanel 51 can be guaranteed to be stable over a long term. Therefore, the performance of the cryopump 50 can be exhibited over a long term with stability.

Figure 5:
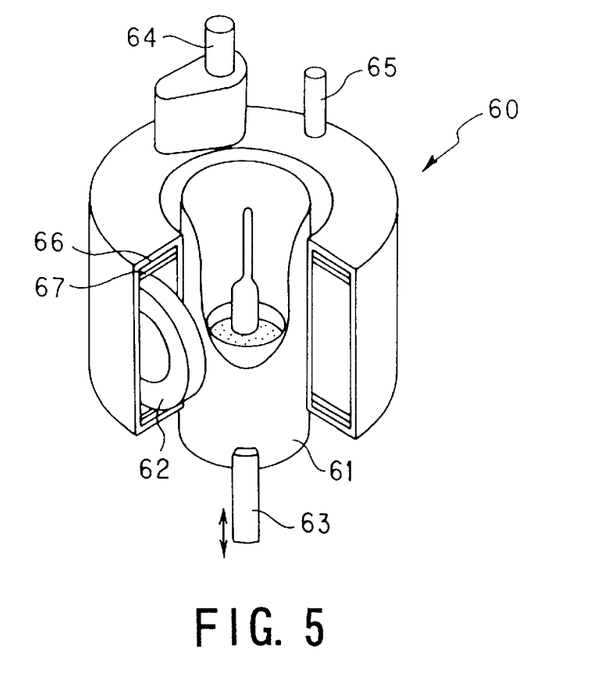
FIG. 5 is a perspective view outlining the essential structure of an in-magnetic field type single crystal pull-up apparatus according to one embodiment of the present invention.

FIG. 5 is a perspective view outlining a structure of an in-magnetic field type single crystal pull-up apparatus involving the cold accumulation refrigerator of the present invention. The in-magnetic field type single crystal pull-up apparatus 60 shown in FIG. 5 is constituted of a crucible for melting raw material, a heater, a single crystal pull-up portion 61 possessing a mechanism of pulling up a single crystal, a superconductive coil 62 for applying a magnetostatic field to a raw material melt, and an elevation mechanism 63 of the single crystal pulling up portion 61. And, as a cooling means of the superconductive coil 62, the above described cold accumulation type refrigerator 64 of the present invention is employed. Now, in the figure, numeral 65 denotes a current lead, numeral 66 denotes a heat shielding plate, numeral 67 denotes a helium container.

With the in-magnetic field type single crystal pull-up apparatus 60 involving a cold accumulation refrigerator 64 of the present invention, since the operating temperature of the superconductive coil 62 can be guaranteed to be stable over a long term, a good magnetic field for suppressing convection of the raw material melt of the single crystal can be obtained over a long term. Therefore, the performance of the in-magnetic field application type single crystal pull-up apparatus 60 can be exhibited with stability over a long term.

As is evident from the above described embodiments, according to the cold accumulating material of the present invention, the cold accumulating material has a structure in which the particulate cold accumulating substances are firmly bonded to each other through the binder, and there can be secured the gaps or pores enabling the cooling medium gas (He gas) to easily pass through the cold accumulating material and to perform the sufficient heat exchange between the cooling medium gas and the cold accumulating material, so that there can be provided a cold accumulating material having an improved mechanical strength and exhibits a stable refrigerating performance for a long time.

Further, when the cold accumulating material is contained in at least part of the cold accumulating unit for the refrigerator, there can be provided a refrigerator having a high refrigerating performance at low temperature range, and capable of maintaining a stable refrigerating performance for a long time.

Furthermore, in an MRI apparatus, a cryopump, a superconducting magnet for magnetic floating train, and a in-magnetic field single crystal pull-up apparatus, since, in all of them, performance of the refrigerator dominates the performance of each apparatus, an MRI apparatus, a cryopump, a superconducting magnet for magnetic floating train, and an in-magnetic field single crystal pull-up apparatus in which the above described refrigerators are assembled therein can exhibit excellent performances for a long term.

What is claimed is:

1. A cold accumulating material comprising a set of particulate cold accumulating substances, pores formed between said particulate cold accumulating substances, and a binder for mutually binding said particulate cold accumulating substances, wherein a porosity of said cold accumulating material is 15–70 vol % and a median diameter of the pores existing in said cold accumulating material is 10–300 μm.

2. A cold accumulating material according to claim 1, wherein an oxygen concentration at an area ranging from a surface of said particulate cold accumulating substance to a portion having a depth of 100 angstroms (A) from said surface is 5–80 at %.

3. A cold accumulating material comprising a set of particulate cold accumulating substances, pores formed between said particulate cold accumulating substances, and a binder for mutually binding said particulate cold accumulating substances, wherein a porosity of said cold accumulating material is 1.5–70 vol %, and a proportion of the particulate cold accumulating substances each having a shape factor of 1.0–5.0 is 80% or more with respect to the whole number of the set of particulate cold accumulating substances, said shape factor being expressed by M/A wherein M is an area of a maximum circle among circles encircling respective projected images which are formed by projecting the respective particulate cold accumulating substances on a plane while A is an area of the respective projected images.

4. A cold accumulating material according to claim 1, wherein said binder is resin.

5. A cold accumulating material according to claim 1, wherein at least part of said particulate cold accumulating substance contains rare earth element.

6. A cold accumulating material according to claim 1, wherein said particulate cold accumulating substance consists of a simple substance of rare earth element or intermetallic compound expressed by general formula: $RM_z$ wherein R denotes at least one of rare earth element selected from the group consisting of Y, La, Ce, Pr, Nd, Pm, Sm, Eu, Gd, Tb, Dy, Ho, Er, Tm and Yb, while M denotes at least one element selected from the group consisting of Ni, Co, Cu, Ag, Al, Ru, In, Ga, Ge, Si and Rh, and z in atomic ratio satisfies a relation: $0 \leq z \leq 9.0$.

7. A cold accumulating material according to claim 1, wherein said particulate cold accumulating substance is antiferromagnetic body.

8. A cold accumulating material according to claim 1, wherein a particle diameter of said particulate cold accumulating substance is 0.01–3 mm.

9. A cold accumulating material according to claim 1, wherein an average particle diameter of powdery binder is ½ or less of an average diameter of said particulate cold accumulating substance.

10. A cold accumulation refrigerator comprising a plurality of cooling stages each composed of a cold accumulating unit filled with a cold accumulating material through which an operating medium flows from a high temperature-upstream side of the cold accumulating unit of each cooling stage, so that heat is exchanged between the operating medium and the cold accumulating material thereby to obtain a lower temperature at a downstream side of the cold accumulating unit, wherein at least part of the cold accumulating material to be filled in the cold accumulating unit is composed of the cold accumulating material as set forth in claim 1.

11. A superconducting magnet comprising a cold accumulation refrigerator as set forth in claim 10.

12. An MRI (Magnetic Resonance Imaging) apparatus comprising a cold accumulation refrigerator as set forth in claim 10.

13. A cryopump comprising a cold accumulation refrigerator as set forth in claim 10.

14. An in-magnetic field single crystal pull-up apparatus comprising a cold accumulation refrigerator as set forth in claim 10.

15. A cold accumulating material comprising a set of particulate cold accumulating substances, pores formed between said particulate cold accumulating substances, and a binder for mutually binding said particulate cold accumulating substances, wherein a porosity of said cold accumulating material is 15–44 vol %.

16. The cold accumulating materials as claimed in claim 15 wherein a porosity of said cold accumulating material is 15–39 vol %.

17. The cold accumulating material as claimed in claim 1 wherein a median diameter of the pores existing in said cold accumulating material is 15–100 μm.

18. The cold accumulating material as claimed in claim 1 wherein a median diameter of the pores existing in said cold accumulating material is 20–80 μm.

* * * * *